(12) United States Patent
Han et al.

(10) Patent No.: US 12,503,392 B2
(45) Date of Patent: Dec. 23, 2025

(54) TRANSPARENT SUBSTRATE PROVIDED WITH THIN MULTILAYER COATING

(71) Applicant: HANKUK GLASS INDUSTRIES, INC., Seoul (KR)

(72) Inventors: Jin Woo Han, Seoul (KR); Yeong Jae Yoo, Jeollabuk-do (KR)

(73) Assignee: HANKUK GLASS INDUSTRIES, INC., Seoul (KR)

( * ) Notice: Subject to any disclaimer, the term of this patent is extended or adjusted under 35 U.S.C. 154(b) by 368 days.

(21) Appl. No.: 18/002,218

(22) PCT Filed: Jun. 8, 2021

(86) PCT No.: PCT/KR2021/007167
§ 371 (c)(1),
(2) Date: Dec. 16, 2022

(87) PCT Pub. No.: WO2021/256766
PCT Pub. Date: Dec. 23, 2021

(65) Prior Publication Data
US 2023/0339806 A1    Oct. 26, 2023

(30) Foreign Application Priority Data
Jun. 17, 2020 (KR) .......... 10-2020-0073875

(51) Int. Cl.
*B32B 15/04* (2006.01)
*B32B 17/06* (2006.01)
*C03C 17/36* (2006.01)

(52) U.S. Cl.
CPC ...... *C03C 17/3615* (2013.01); *C03C 17/3657* (2013.01); *C03C 17/3686* (2013.01);
(Continued)

(58) Field of Classification Search
CPC .................................. C03C 17/3686
(Continued)

(56) References Cited

U.S. PATENT DOCUMENTS 6,060,178 A * 5/2000 Krisko ............... C03C 17/3686
359/359
6,589,658 B1 * 7/2003 Stachowiak ............ C03C 17/36
428/704
(Continued)

FOREIGN PATENT DOCUMENTS

JP 2016513056 A 5/2016
JP 2018520982 A 8/2018
(Continued)

OTHER PUBLICATIONS

Refractive index, 2025.*
(Continued)

*Primary Examiner* — Lauren R Colgan
(74) *Attorney, Agent, or Firm* — DICKINSON WRIGHT PLLC

(57) ABSTRACT

Provided is a transparent substrate with a multilayer thin film coating, in which the multilayer thin film coating includes a lower dielectric layer, a lower protective layer, a metal functional layer having an infrared reflection function, an upper protective layer, and an upper dielectric layer, which are sequentially laminated on the transparent substrate, the thickness of the metal function layer is 12 nm or more, and the thickness of the lower protective layer is larger than that of the upper protective layer and the thickness of the lower protective layer is 2 nm or more.

15 Claims, 6 Drawing Sheets

(52) U.S. Cl.
CPC .... *C03C 2217/212* (2013.01); *C03C 2217/27* (2013.01); *C03C 2217/281* (2013.01)

(58) Field of Classification Search
USPC .................................................. 428/434, 432
See application file for complete search history.

(56) References Cited

U.S. PATENT DOCUMENTS

| | | | | |
|---|---|---|---|---|
| 6,632,491 | B1* | 10/2003 | Thomsen | C03C 27/10 52/786.13 |
| 7,556,868 | B2* | 7/2009 | Thiel | C03C 17/3644 428/428 |
| 7,582,356 | B2* | 9/2009 | Brochot | C03C 17/3644 428/428 |
| 7,655,313 | B2 | 2/2010 | Blacker et al. | |
| 7,964,284 | B2 | 6/2011 | Blacker et al. | |
| 7,998,602 | B2* | 8/2011 | Medwick | C03C 17/3644 428/428 |
| 8,097,342 | B2* | 1/2012 | Thomsen | C03C 17/3602 428/428 |
| 9,126,862 | B2 | 9/2015 | Kim et al. | |
| 9,688,572 | B2* | 6/2017 | Kim | C03C 17/3636 |
| 10,100,202 | B2* | 10/2018 | Disteldorf | C03C 17/3626 |
| 10,287,207 | B2 | 5/2019 | Melcher et al. | |
| 10,745,318 | B2* | 8/2020 | Lorenzzi | C03C 17/3642 |
| 10,876,736 | B2* | 12/2020 | Urien | C03C 17/3626 |
| 11,105,966 | B2 | 8/2021 | You et al. | |
| 2003/0113550 | A1* | 6/2003 | Millett | A47F 3/0434 428/689 |
| 2004/0137237 | A1* | 7/2004 | Stachowiak | C03C 17/366 204/192.27 |
| 2004/0253471 | A1* | 12/2004 | Thiel | B32B 17/06 428/544 |
| 2005/0145480 | A1* | 7/2005 | Neuman | C03C 17/3644 204/192.27 |
| 2005/0191502 | A1* | 9/2005 | Lemmer | C03C 17/36 428/432 |
| 2006/0257670 | A1* | 11/2006 | Brochot | C03C 17/36 428/432 |
| 2007/0188871 | A1* | 8/2007 | Fleury | C03C 17/3435 359/586 |
| 2008/0226925 | A1* | 9/2008 | Blacker | C03C 17/3644 428/428 |
| 2010/0104840 | A1* | 4/2010 | Blacker | C03C 17/3607 428/216 |
| 2010/0206290 | A1* | 8/2010 | Thomsen | C03C 23/007 204/192.15 |
| 2010/0209729 | A1* | 8/2010 | Thomsen | C03C 17/3686 428/622 |
| 2010/0209730 | A1* | 8/2010 | Thomsen | C03C 17/3655 428/623 |
| 2011/0008641 | A1* | 1/2011 | Di Stefano | C03C 17/3652 428/408 |
| 2012/0028009 | A1* | 2/2012 | Gerardin | C03C 17/36 428/212 |
| 2012/0084963 | A1* | 4/2012 | Thomsen | C03C 17/3686 65/60.2 |
| 2012/0177899 | A1* | 7/2012 | Unquera | C03C 17/3649 428/428 |
| 2012/0225317 | A1* | 9/2012 | Imran | C22C 19/053 427/160 |
| 2014/0193636 | A1 | 7/2014 | Kim et al. | |
| 2014/0198389 | A1* | 7/2014 | Laurent | C03C 17/3626 359/585 |
| 2014/0362434 | A1* | 12/2014 | Schmitz | B32B 17/10761 427/125 |
| 2016/0002100 | A1* | 1/2016 | Melcher | B32B 17/10174 204/192.27 |
| 2016/0031751 | A1* | 2/2016 | Mahieu | C03C 17/3642 428/428 |
| 2016/0145151 | A1* | 5/2016 | Mahieu | C03C 17/366 428/213 |
| 2018/0003394 | A1* | 1/2018 | Urien | C03C 17/3686 |
| 2018/0194675 | A1* | 7/2018 | Lorenzzi | C03C 17/3649 |
| 2019/0203529 | A1* | 7/2019 | You | C03C 17/3649 |
| 2019/0218140 | A1* | 7/2019 | Mercadier | G02B 1/11 |
| 2019/0337843 | A1* | 11/2019 | Morin | C03C 17/3681 |
| 2023/0017107 | A1* | 1/2023 | Han | C03C 17/3652 |
| 2023/0348321 | A1* | 11/2023 | Han | C03C 17/3649 |

FOREIGN PATENT DOCUMENTS

| | | |
|---|---|---|
| KR | 20130020029 A | 2/2013 |
| KR | 20160147387 A | 12/2016 |
| KR | 20180027062 A | 3/2018 |
| KR | 20210074757 A | 6/2021 |
| WO | 2008115329 A1 | 9/2008 |
| WO | 2011011034 A | 1/2011 |
| WO | 2011011036 A1 | 1/2011 |
| WO | 2021118300 A1 | 6/2021 |

OTHER PUBLICATIONS

PCT/KR2021/007167 English Translation of Search Report, mailed Sep. 15, 2021.
PCT/KR2021/007167 Search Report and Written Opinion, mailed Sep. 15, 2021.

* cited by examiner

TRANSPARENT SUBSTRATE PROVIDED WITH THIN MULTILAYER COATING

CROSS-REFERENCE TO RELATED APPLICATIONS

This application is a 35 U.S.C. § 371 national phase of PCT International Application No. PCT/KR2021/007167, filed Jun. 8, 2021, which claims the benefit of priority under 35 U.S.C. § 119 to Korean Patent Application No. 10-2020-0073875, filed Jun. 17, 2020, the contents of which are incorporated herein by reference in their entirety.

FIELD

The present disclosure relates to a transparent substrate with a multilayer thin film coating. More specifically, the present disclosure relates to a transparent substrate with a multilayer thin film coating capable of improving durability and optical properties.

BACKGROUND

In the case of a door or window applied to a heating device such as an oven or boiler, while visible rays can be transmitted enough to look into the door or window from the outside, infrared rays can be blocked so that a high temperature inside the heating device is not transmitted to the outside. In addition, durability capable of withstanding a high-temperature heating environment during internal heating is required. In the related art, glass without a coating is used, or in order to obtain durability and low emissivity, hard coating low-E glass formed with a transparent conductive coating layer of a fluorine-doped tin oxide (FTO) coating using a pyrolytic process has been mainly used. However, since such a coating layer has excellent durability to heat, but high emissivity and low infrared reflectance, it is difficult to effectively block the heat transfer from the inside.

As an alternative thereto, it has been considered to apply low-emissivity or low-E glass, in which a low-emissivity layer containing a metal with high reflectance in an infrared region, such as silver (Ag), is deposited as a thin film, to an oven door, or the like. Emissivity refers to the degree to which heat is emitted from the surface of an object during thermal radiation, and has a relation of (emissivity)=1−(reflectance). Therefore, the lower the emissivity, the better the reflection and the more infrared energy is reflected, and accordingly, the heat transfer is reduced and a thermal transmittance coefficient is lowered, thereby increasing a thermal insulation effect. Therefore, when the low-E glass is used for a door or window applied to the heating device, it is possible to effectively block internal heat from being transferred to the outside. However, in the low-E glass to which such a low-emissivity layer is applied, in order to increase the infrared reflectance by lowering the emissivity, it is effective to increase the thickness of a metal functional layer such as silver, and in this case, we have discovered that the initial emissivity, that is, the infrared reflectance is rapidly reduced due to repeated use.

SUMMARY

Technical Problem

The present disclosure has been made in an effort to provide a transparent substrate with a multilayer thin film coating with improved durability even a repeated use environment at a high temperature while having excellent low emissivity and infrared reflection properties.

However, problems to be solved by exemplary embodiments of the present disclosure are not limited to the above-described problems and may be variously expanded within the scope of the technical idea included in the present disclosure.

Technical Solution

An exemplary embodiment of the present disclosure provides a transparent substrate with a multilayer thin film coating, in which the multilayer thin film coating includes a lower dielectric layer, a lower protective layer, a metal functional layer having an infrared reflection function, an upper protective layer, and an upper dielectric layer, which are sequentially laminated on the transparent substrate, the thickness of the metal function layer is 12 nm or more, and the thickness of the lower protective layer is larger than that of the upper protective layer and the thickness of the lower protective layer is 2 nm or more.

The lower dielectric layer may include a lower barrier layer, and the lower barrier layer may have a refractive index of 2.0 to 2.2.

The thickness of the upper protective layer may be 0.3 nm to 0.7 nm.

The thickness of the lower protective layer may be 2.5 nm or more.

The thickness of the metal function layer may be 15 nm or more.

The lower dielectric layer may include a planarization layer, and the planarization layer may be formed in contact directly under the lower protective layer.

The transparent substrate may further include an overcoat on the upper dielectric layer, in which the overcoat may include titanium oxide ($TiO_2$).

Each of the upper protective layer and the lower protective layer may include one or more of titanium, nickel, chromium and niobium, or an alloy thereof.

The lower protective layer each may include a nickel-chromium alloy.

The lower dielectric layer may include silicon nitride.

The planarization layer may be formed by doping silicon nitride with zirconium (Zr).

The thickness of the planarization layer doped with the zirconium (Zr) may be less than 15 nm.

The vertical emissivity (normal emissivity) of the transparent substrate may be 0.035 or less.

The shading coefficient of the transparent substrate may be 0.55 or less.

The visible light transmittance of the transparent substrate may be 65% to 85%.

The visible light reflectance of the coating surface of the transparent substrate may be 3% to 20%.

Another exemplary embodiment of the present disclosure provides an oven door including the transparent substrate.

Advantageous Effects

According to an exemplary embodiment of the present disclosure, it is possible to obtain a transparent substrate including a multilayer thin film coating with improved durability at a high temperature even with excellent transmittance and emissivity.

DETAILED DESCRIPTION

Figure 1:
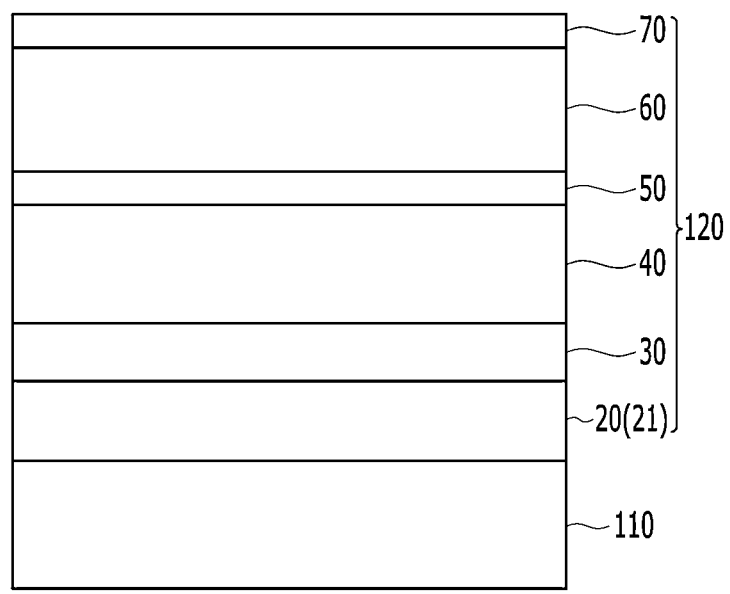
FIG. 1 is a diagram illustrating a cross section of a transparent substrate with a multilayer thin film coating according to an exemplary embodiment of the present disclosure.

The present disclosure will be described more fully hereinafter with reference to the accompanying drawings, in which various exemplary embodiments of the disclosure are shown. The present disclosure may be implemented in various different forms and is not limited to embodiments described herein.

A part irrelevant to the description will be omitted to clearly describe the present disclosure, and like or similar components will be designated by like reference numerals throughout the specification.

In addition, since the size and thickness of each component illustrated in the drawings are arbitrarily illustrated for convenience of description, the present disclosure is not necessarily limited to those illustrated in the drawings. In the drawings, in order to clearly express various layers and regions in the drawings, the thicknesses thereof are enlarged. In addition, in the drawings, for convenience of description, thicknesses of a partial layer and a region are exaggeratedly illustrated.

Terms such as first, second and third are used to describe various parts, components, regions, layers and/or sections, but are not limited thereto. These terms are used only to distinguish one part, component, region, layer or section from the other part, component, region, layer or section. Accordingly, a first part, component, region, layer or section to be described below may be referred to as a second part, component, region, layer or section without departing from the scope of the present disclosure.

The terms used herein are only for the purpose of describing specific exemplary embodiments and are not intended to limit the present disclosure. The singular forms used herein include plural forms, unless expressly indicated to the contrary thereto. The "comprising" used herein means embodying a specific feature, region, integer, step, operation, element and/or component, and the existence or addition of other features, regions, integers, steps, operations, elements, and/or components is not excluded.

When a part refers to being "above" or "on" the other part, or "below" or "under" the other part, the part may be disposed directly above or below the other part or another part may be included therebetween. In contrast, when a part refers to being "directly above" or "directly below" the other part, another part is not interposed therebetween.

Unless defined otherwise, all terms including technical and scientific terms used herein have the same meaning as commonly understood by those skilled in the art to which the present disclosure pertains. Commonly used predefined terms are further interpreted as having a meaning consistent with the relevant technical literature and the present disclosure, and are not to be construed as ideal or very formal meanings unless defined otherwise.

In the present disclosure, the terms "emissivity" and "transmittance" are used as those commonly known in the art. The "emissivity" is a measure of how much light is absorbed and reflected at a given wavelength. In general, the following equation is satisfied.

$$(\text{Emissivity}) = 1 - (\text{Reflectance})$$

In this specification, the term "transmittance" refers to visible light transmittance.

Unless defined otherwise, all terms including technical and scientific terms used herein have the same meaning as commonly understood by those skilled in the art to which the present disclosure pertains. Commonly used predefined terms are further interpreted as having a meaning consistent with the relevant technical literature and the present disclosure, and are not to be construed as ideal or very formal meanings unless defined otherwise.

FIG. 1 is a diagram illustrating a cross section of a transparent substrate 100 with a multilayer thin film coating according to an exemplary embodiment of the present disclosure. The transparent substrate 100 with the multilayer thin film coating of FIG. 1 is merely illustrative of the present disclosure, and the present disclosure is not limited thereto. Accordingly, the transparent substrate 100 with the multilayer thin film coating of FIG. 1 may be modified into various shapes.

Referring to FIG. 1, the transparent substrate 100 with the multilayer thin film coating according to an exemplary embodiment of the present disclosure includes a transparent substrate 110 and a multilayer thin film coating 120 formed on the transparent substrate 110.

The transparent substrate 110 is not particularly limited, but is preferably made of a hard inorganic material such as glass or an organic material of a polymer substrate.

The multilayer thin film coating 120 includes a lower dielectric layer 20, a lower protective layer 30, a metal functional layer 40 having an infrared reflection function, an upper protective layer 50, and an upper dielectric layer 60, which are sequentially formed from the transparent substrate 110. The multilayer thin film coating 120 further includes an overcoat 70 on the upper portion of the upper dielectric layer 60, that is, on one side in a direction away from the transparent substrate 110.

The metal functional layer 40 has infrared (IR) reflection characteristics. The metal function layer 40 may include one or more of gold (Au), copper (Cu), palladium (Pd), aluminum (Al), and silver (Ag). Specifically, silver or a silver alloy may be included. The silver alloy may include a silver-gold alloy and a silver-palladium alloy. Among them, silver having low resistivity may be particularly preferably included.

The upper protective layer 50 is included on the upper surface of the metal functional layer 40. The upper protective layer 50 may prevent the metal functional layer 40 from being oxidized and corroded. In an exemplary embodiment of the present disclosure, the thickness of the upper protective layer 50 may be 0.3 nm to 0.7 nm. In a preferred exemplary embodiment, the thickness of the upper protective layer 50 may be 0.3 nm to 0.5 nm. The upper protective layer 50 may include one or more of titanium, nickel, chromium, and niobium. More specifically, the upper protective layer 50 may include a nickel-chromium alloy.

Meanwhile, the thickness of the metal function layer 40 may be 12 nm or more, more preferably 15 nm to 25 nm. When the thickness of the metal functional layer 40 is less than 12 nm, it is difficult to obtain a thermal insulation property required for being used as glass constituting a high-temperature heating device, for example, an oven door or the like. When the thickness of the metal functional layer 40 is 12 nm or more, preferably 15 nm or more, low emissivity of less than 5% may be obtained, thereby securing the user's safety when used as glass such as an oven door or the like.

However, in the case of using the relatively thick metal functional layer 40 as described above, as the number of repetitions increases during repeated exposure to a high temperature, the thermal insulation performance may be deteriorated. As such, it may be considered that the reason why the thermal insulation performance is lowered by repeating the process at a high temperature is that the free electron mobility in the metal functional layer 40 is lowered. As such, factors for inhibiting free electron mobility may include scattering caused by electrons colliding with the surface of the metal functional layer 40 or scattering caused by collision at a grain boundary inside the metal functional layer 40. Therefore, in order to suppress the functional deterioration as described above, that is, the deterioration of the thermal insulation performance (that is, an increase in emissivity) caused by repeated exposure to a high temperature, it is necessary to suppress electron collision on the surface and the grain boundary of the metal functional layer 40.

In particular, like an exemplary embodiment of the present disclosure, when the metal functional layer 40 is thickened for a high thermal insulation property, a distance between the upper and lower portions of the metal functional layer 40 is relatively large, so that the influence of scattering on the grain boundary is greater than that of scattering on the surface. Accordingly, it is possible to suppress the free electron mobility from being inhibited by suppressing the grain boundary from being increased inside the metal functional layer 40.

However, when a process in which the transparent substrate 100 with the multilayer thin film coating is exposed to a high temperature environment and then cooled is repeated, a metal such as silver included in the metal functional layer 40 may be melted at a high temperature (wetting), and when the temperature of the heating device is lowered again, a process of re-crystallizing the temporarily melted metal is repeated. At this time, impurities such as sodium ions from the transparent substrate 110 in a high temperature state penetrate into the metal functional layer 40 in a wetting state to serve as a seed of the grain boundary. Accordingly, it is possible to prevent a decrease in emissivity due to repeated use at a high temperature by blocking the impurities from moving from the transparent substrate 110 to the metal functional layer 40. The lower protective layer 30 may be included on a lower surface of the metal functional layer 40. The lower protective layer 30 may not only prevent the metal functional layer 40 from being oxidized and corroded, but also block the impurities from moving from the transparent substrate 110 to the metal functional layer 40 as described above. In order to effectively achieve the blocking of the impurities, the thickness of the lower protective layer 30 may be 2 nm or more, more preferably 2.25 nm to 4 nm. When the thickness of the lower protective layer 30 exceeds 4 nm, a single plate transmittance is 60% or less and the emissivity is 20% or more, so that it is unsuitable to be used as an oven door or the like.

In addition, the thickness of the lower protective layer 30 is greater than that of the upper protective layer 60. The thickness of the lower protective layer 30 is greater than that of the upper protective layer 50, thereby further increasing durability, particularly chemical durability. In the transparent substrate 100 formed with the multilayer thin film coating 120, shearing stress is applied to the upper dielectric layer 60 located thereon, and as a result, the peeling of the multilayer thin film coating 120 mainly occurs in the lower portion of the laminated structure, that is, on the side close to the transparent substrate 110. In an exemplary embodiment of the present disclosure, the thickness of the lower protective layer 30 is greater than that of the upper protective layer 50 to more effectively prevent corrosion and peeling that may occur on the side close to the transparent substrate 110. Accordingly, it is possible to obtain more excellent durability than that of a case where the sum thickness of the lower protective layer 30 and the upper protective layer 50 is the same. As a result, it is possible to obtain the multilayer thin film coating 120 with improved durability by suppressing both corrosion and peeling caused thereby even while achieving the low-emissivity performance, that is, low emissivity and high transmittance of the multilayer thin film coating 120.

In particular, when used in an environment exposed to a high temperature, such as an oven door, a metal such as silver included in the metal functional layer 40 may be melted at a high temperature (wetting), and when the temperature of the heating device is lowered again, the process of recrystallizing the temporarily melted metal is repeated. However, during recrystallization, impurities and the like may be included to cause the corrosion of the metal or the peeling of the metal functional layer 40. However, according to an exemplary embodiment of the present disclosure, protective layers in a predetermined thickness range are provided on the upper and lower portions of the metal functional layer 40, respectively, and in particular, at this time, the thickness of the lower protective layer 30 is greater than that of the upper protective layer 50 to suppress the occurrence of such corrosion and peeling.

The lower protective layer 30 may include one or more of titanium, nickel, chromium, and niobium. More specifically, the lower protective layer 30 may include a nickel-chromium alloy.

In addition, the lower dielectric layer 20 is included between the transparent substrate 110 and the metal functional layer 40, more specifically between the lower protective layer 30 and the transparent substrate 110. In addition, the lower dielectric layer 20 may include at least one layer, and as at least one layer included in the lower dielectric layer 20, a lower barrier layer 21 is included, thereby effectively blocking impurities from moving from the transparent substrate 110 to the metal function layer 40. The lower dielectric layer 20 may include metal oxide, metal nitride, or metal oxynitride. The metal may include one or more of titanium (Ti), hafnium (Hf), zirconium (Zr), zinc (Zn), indium (In), tin (Sn), and silicon (Si), preferably silicon nitride ($Si_3N_4$).

In particular, the lower barrier layer 21 preferably has a refractive index of 2.0 to 2.2. When the refractive index is less than 2.0, since the density of the lower barrier layer 21 is low, it is difficult to block diffusion of impurities from the transparent substrate 110. The lower barrier layer 21 having a refractive index of 2.0 or more may be obtained by sputtering in a low-pressure and high-power environment. The thickness of the lower barrier layer 21 obtained as described above may be 30 nm to 45 nm.

In addition, by forming the lower barrier layer 21 to have a high refractive index (2.0 to 2.2) as described above, the surface roughness of the lower barrier layer 21 may also be reduced, and accordingly, the surface roughness of the metal functional layer 40 formed thereon is also reduced, and as a result, the resistivity of the metal functional layer 40 may be lowered. That is, as described above, by reducing the surface roughness of the metal functional layer 40, it is possible to suppress a decrease in free electron mobility due to scattering due to surface collision inside the metal functional layer 40, thereby preventing deterioration of thermal insulation performance (i.e., an increase in emissivity) due to repeated exposure to the high temperature.

On the upper surface of the upper protective layer 50, the upper dielectric layer 60 that blocks oxygen, moisture, and the like from penetrating therein is included. That is, the upper protective layer 50 may be laminated between the metal functional layer 40 and the upper dielectric layer 60. The upper dielectric layer 60 includes at least one dielectric layer. The dielectric layer may include metal oxide, metal nitride, or metal oxynitride. The metal may include one or more of titanium (Ti), hafnium (Hf), zirconium (Zr), zinc (Zn), indium (In), tin (Sn), and silicon (Si). Preferably, the metal may include silicon nitride ($Si_3N_4$). The upper dielectric layer 60 may also be formed as a single layer as illustrated in FIG. 1, or may be a laminate of two or more layers, but is not particularly limited.

In addition, the upper dielectric layer 60 may be in direct contact with the upper protective layer 50 to be formed directly on the upper protective layer 50. The thickness of the upper dielectric layer 60 may be 30 nm or more, more specifically 35 nm to 50 nm. In addition, the upper dielectric layer 60 may be thicker than the lower dielectric layer 20, and for example, a thickness ratio of the upper dielectric layer 60 to the lower dielectric layer 20 may be 1.1:1 to 1.4:1. As such, it is possible to control reflection colors of the multilayer thin film coating and increase the transmittance at the same time by controlling the thickness ratio of the upper dielectric layer 60 and the lower dielectric layer 20 as described above.

In addition, the upper dielectric layer 60 may be further doped with aluminum or the like. By doping aluminum, the dielectric layer may be smoothly formed in the manufacturing process. In addition, in addition to aluminum, various doping agents, such as fluorine, carbon, nitrogen, boron, phosphorus, zirconium, zinc, or the like, may be used to improve the formation rate of the dielectric layer by sputtering as well as the optical properties of the film.

In addition, the outermost side of the multilayer thin film coating 120 may further include an overcoat 70. That is, the overcoat 70 is included on the upper portion of the upper protective layer 50, that is, on one side away from the transparent substrate 110. The overcoat 70 may include one or more selected from titanium oxide (TiO), titanium nitride (TiN), titanium oxynitride (TiON), zirconium oxide (ZrO), zirconium nitride (ZrN), and zirconium oxynitride (ZrON). Preferably, the overcoat 70 may include titanium oxide ($TiO_2$). By including the overcoat 70, it is possible to prevent damage to the layers included in the multilayer thin film coating 120. The thickness of the overcoat 70 may be 1 nm to 5 nm.

As such, by providing the metal functional layer 40 having a thickness of 12 nm or more, the lower protective layer 30 having a thickness of 2 nm or more between the transparent substrate 110, and the lower barrier layer 21 having a refractive index of 2.0 to 2.2, even if the metal functional layer 40 having a thick thickness is used, a high-temperature insulation property may be maintained without reducing the emissivity even in an environment in which heating to a high temperature and cooling are repeated when a heating device or the like is applied.

Figure 2:
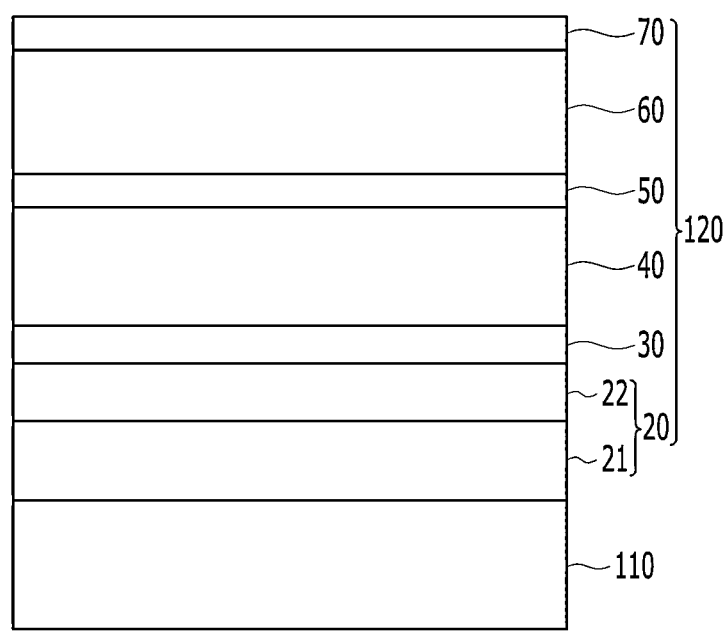
FIG. 2 is a diagram illustrating a cross section of a transparent substrate 100 with a multilayer thin film coating according to a second exemplary embodiment of the present disclosure.

Next, a second exemplary embodiment of the present disclosure will be described with reference to FIG. 2. FIG. 2 is a diagram illustrating a cross section of a transparent substrate 100 with a multilayer thin film coating according to a second exemplary embodiment of the present disclosure.

The second exemplary embodiment of the present disclosure has the same configuration as the first exemplary embodiment, except that the lower dielectric layer 20 further includes a planarization layer 22 between the lower barrier layer 21 and the lower protective layer 30, and thus, the duplicated description will be omitted.

As illustrated in FIG. 2, the multilayer thin film coating 120 of the exemplary embodiment may further include the planarization layer 22 between the lower barrier layer 21 and the lower protective layer 30. That is, the planarization layer 22 is disposed directly under the lower protective layer 30 and in contact with the lower protective layer 30. The planarization layer 22 may be formed by including a doping element in metal oxide, metal nitride, or metal oxynitride. The metal may include one or more of titanium (Ti), hafnium (Hf), zinc (Zn), indium (In), tin (Sn), and silicon (Si). Preferably, the metal may include silicon nitride. The doping element may include zirconium, and may be doped at a concentration of 15 to 30 at %, preferably 15 to 25 at %, based on the total atoms of the planarization layer 22.

In addition, the thickness of the planarization layer 22 may be 5 nm to 15 nm, preferably 10 nm or more and less than 15 nm.

As such, the surface of the metal functional layer 40 is further planarized by providing the planarization layer 22 to improve the resistivity of the metal functional layer 40, thereby preventing the emissivity and the thermal insulation property from being lowered.

Meanwhile, although only one set of multilayer thin film coatings is illustrated in the drawings of the present disclosure, two or more sets of the same multilayer thin film coatings may be laminated to form a multilayer thin film coating, and the present disclosure is not particularly limited.

Due to the above-described configuration, the transparent substrate 100 with the multilayer thin film coating 120 according to exemplary embodiments of the present disclosure has excellent characteristics even in terms of transmittance and reflectance while maintaining excellent emissivity and shading coefficient.

That is, vertical emissivity (normal emissivity) may be 0.035 or less, and the shading coefficient may be 0.55 or less. In addition, a visible light transmittance (TL) may be 65% to 85%, and a coated surface reflectance of visible light may be 3% to 20%.

The transparent substrate 100 according to an exemplary embodiment of the present disclosure may be used as a door or window included in a heating device such as an oven, a boiler, or the like. In particular, when the transparent substrate 100 is used in such a heating device, even if cycles to be exposed to a high temperature by heating and then cooled are repeated, the emissivity or the thermal insulation property is not decreased, so that high heat inside the device is not transmitted to a user even if used for a long time, and may be safely used. Therefore, it is possible to improve the life of the heating device itself.

Hereinafter, the present disclosure will be described in more detail through Experimental Examples. However, these Experimental Examples are only illustrative of the present disclosure, and the present disclosure is not limited thereto.

Experimental Examples

Evaluation 1: Evaluation of Resistance Change of Metal Functional Layer According to Thickness of Lower Protective Layer Lower dielectric layer/lower protective layer/metal functional layer/upper protective layer/upper dielectric layer were sequentially laminated on a transparent substrate to form a transparent substrate with a multilayer thin film coating.

A glass substrate with a thickness of 5 mm (trade name: Hanlite Clear, manufactured by HanGlas Co., Ltd.) was used as the transparent substrate. As the lower dielectric layer, a single lower barrier layer was formed, and a $Si_3N_4$ layer was formed to a thickness of 40 nm, and as the lower protective layer, a NiCr layer was formed by varying a thickness thereof as shown in Table 1 below. As the metal functional layer, an Ag layer was formed with a thickness of 15 nm, and as the upper protective layer, a NiCr layer was formed with a thickness of 0.5 nm. As the upper dielectric layer, a $Si_3N_4$ layer was formed with a thickness of 45 nm.

TABLE 1

|  | Thickness (nm) of lower protective layer (NiCr) | Thickness (nm) of metal function layer |
| --- | --- | --- |
| Comparative Example 1 | 0.5 | 15 |
| Comparative Example 2 | 1 | 15 |
| Comparative Example 3 | 1.5 | 15 |
| Example 1 | 2 | 15 |
| Example 2 | 2.5 | 15 |

With respect to the transparent substrates with the multilayer thin film coatings of Examples and Comparative Examples having the laminated structure of Table 1, resistance values of the metal functional layers before and after aging were measured to confirm changes in resistance values. That is, a Samsung's NE59J7630SS oven was used as a heating device, and the transparent substrates were heated for 2 hours at a temperature of 443° C. under environments of an external temperature of 21 to 22° C. and an external humidity of RH 50 to 60%, and then cooled (turned on the power and opened the oven door after 1 hour has elapsed to be additionally cooled with air for 2 hours) as 1 cycle, and aged by applying total 20 cycles. The results were shown in Table 2 below.

TABLE 2

|  | Initial resistance value [ohm/sq] | Resistance value after 20 cycles [ohm/sq] | Increased amount (%) |
| --- | --- | --- | --- |
| Comparative Example 1 | 3.3 | 3.62 | 9.7 |
| Comparative Example 2 | 3.29 | 3.55 | 7.9 |
| Comparative Example 3 | 3.29 | 3.46 | 5.2 |
| Example 1 | 3.24 | 3.29 | 1.5 |
| Example 2 | 3.22 | 3.24 | 0.6 |

Further, as Reference Examples, the same evaluation was performed under the same conditions by varying only the thickness of the metal functional layer to 10 nm, and the results were shown in Table 3 below.

TABLE 3

|  | Thickness (nm) of lower protective layer (NiCr) | Thickness (nm) of metal function layer | Initial resistance value [ohm/sq] | Resistance value after 20 cycles [ohm/sq] | Increased amount (%) |
| --- | --- | --- | --- | --- | --- |
| Reference Example 1 | 0.5 | 10 | 7.53 | 7.65 | 1.6 |
| Reference Example 2 | 1 | 10 | 7.65 | 7.72 | 0.9 |
| Reference Example 3 | 1.5 | 10 | 7.48 | 7.54 | 0.8 |
| Reference Example 4 | 2 | 10 | 7.52 | 7.58 | 0.8 |
| Reference Example 5 | 2.5 | 10 | 7.42 | 7.49 | 0.9 |

As shown in Reference Examples, when the metal functional layer is thin, since the resistance values after aging are not changed significantly, it can be seen that the deterioration of performance due to repeated use is not large. However, the initial resistance value is very large, and the initial surface temperature is 70° C. or higher, so that it is determined that it is difficult to be used as an oven door.

Meanwhile, as shown in Table 2, it can be seen that in Comparative Examples 1 to 3 including the metal functional layer having a thickness of 15 nm, but having the thickness of the lower protective layer of less than 2 nm, the resistance values of the metal functional layer rapidly increases due to aging. This is caused by a decrease in free electron mobility, which means that the emissivity is increased and the thermal insulation performance is deteriorated, so that the performance as the oven door is rapidly deteriorated. On the other hand, in Examples 1 and 2, in which the thickness of the lower protective layer was 2 nm or more, it was confirmed that even though the metal functional layer having a thickness of 15 nm was included, the resistance value after aging hardly increased, so that the initial emissivity and the thermal insulation performance were maintained as they were. In particular, as there was a change similar to the change amount in Reference Examples, even if a thick functional layer was included, it was confirmed that the resistance increase was suppressed to the level when a thin functional layer was applied.

Evaluation 2: Performance Evaluation According to Refractive Index of Lower Barrier Layer In the multilayer thin film coating of Evaluation 1, the thickness of the lower protective layer was fixed to 2 nm, and Comparative Example 4 using $Si_3N_4$ having a refractive index of 1.9 as the lower barrier layer and Example 3 using $Si_3N_4$ having a refractive index of 2.0 as the lower barrier layer were prepared.

Figure 3A:
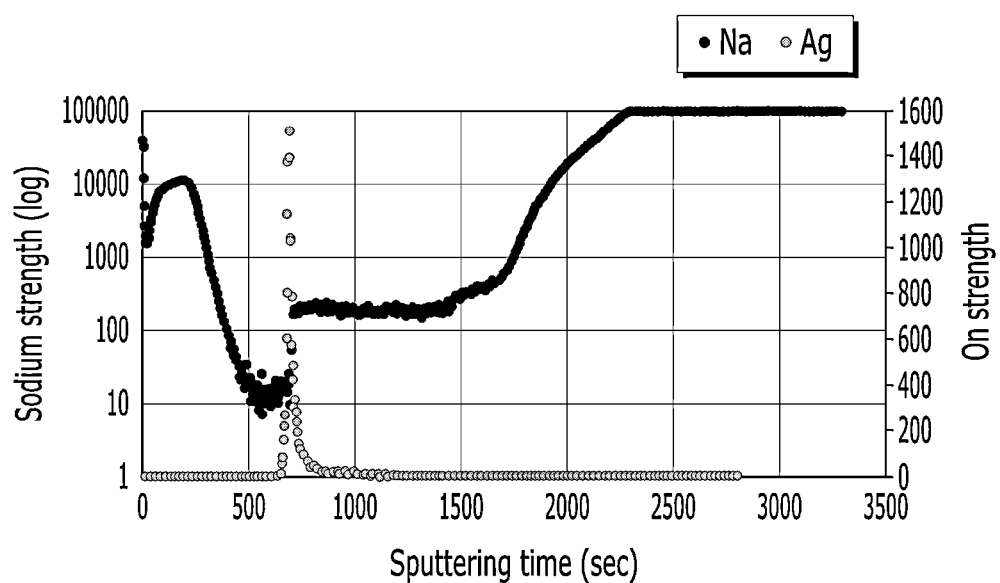
FIGS. 3A and 3B are TOF-SIMS graphs for confirming whether sodium is diffused in a transparent substrate with a multilayer thin film coating according to Example 3 and Comparative Example 4, respectively.
Figure 3B:
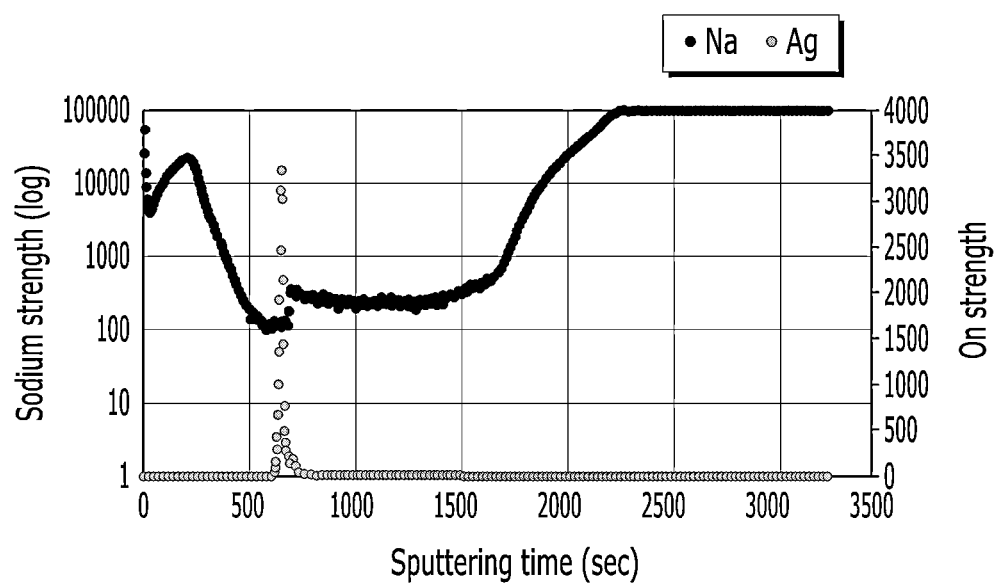

For each sample, FIGS. 3A and 3B illustrate results of confirming a sodium diffusion profile by time-of-flight secondary ion mass spectrometry (TOF-SIMS). FIGS. 3A and 3B are TOF-SIMS graphs for confirming whether sodium is diffused in a transparent substrate with a multilayer thin film coating according to Example 3 and Comparative Example 4, respectively.

As illustrated in FIG. 3A, in the case of Example 3, it was confirmed that the sodium strength was sharply decreased on the left side at a point where the concentration of silver was rapidly increased, so that sodium diffusion from the transparent substrate corresponding to data on the right side was blocked. On the other hand, as illustrated in FIG. 3B, in the case of Comparative Example 4, it was confirmed that the sodium strength was almost not decreased on the left side at the point where the concentration of silver was rapidly increased, so that sodium diffusion from the transparent substrate corresponding to data on the right side was almost not blocked. As such, by blocking the diffusion of impurities such as sodium from the transparent substrate, the formation of a grain boundary in the metal functional layer is suppressed, and it is possible to prevent an increase in emissivity and a decrease in thermal insulation property due to repeated use at a high temperature.

Figure 4A:
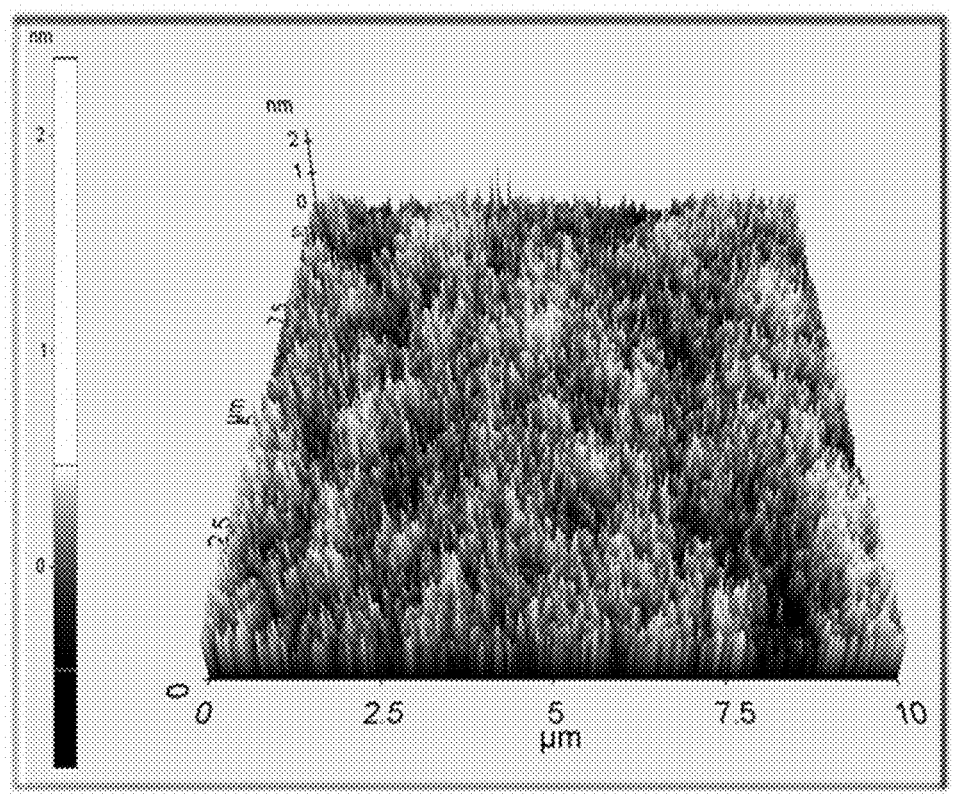
FIGS. 4A and 4B are photographs showing a result of atomic force microscopy (AFM) of measuring surface roughness with respect to a lower barrier layer of a transparent substrate with a multilayer thin film coating according to Example 3 and Comparative Example 4, respectively.
Figure 4B:
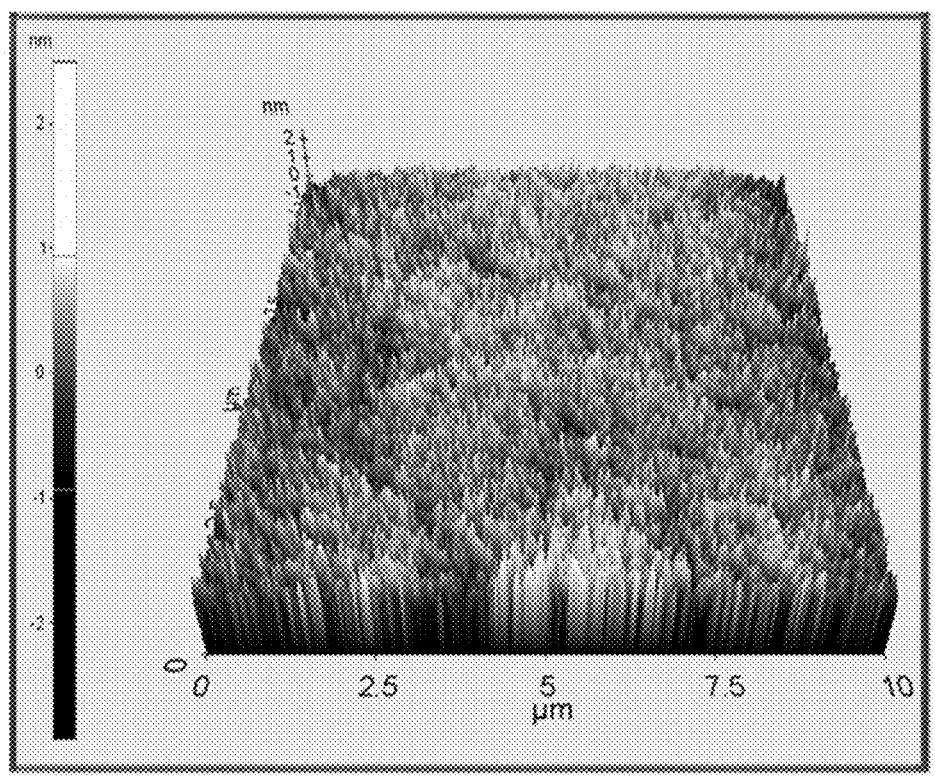

In addition, the results of measuring the surface roughness of the lower barrier layers in Example 3 and Comparative Example 4 are illustrated in FIGS. 4A and 4B. FIGS. 4A and 4B are photographs showing a result of atomic force microscopy (AFM) of measuring surface roughness with respect to a lower barrier layer of a transparent substrate with a multilayer thin film coating according to Example 3 and Comparative Example 4, respectively.

As a result of measuring each 10 μm*10 μm sample, it was confirmed that the surface roughness (RMS roughness) was 0.241 nm in the case of Example 3 and 0.476 nm in the case of Comparative Example 4, and the surface roughness was reduced in Example 3 with a refractive index of 2.0. In addition, it was confirmed that the resistivity of the metal functional layer in Example 3 having smaller surface roughness was lower than that in Comparative Example 4.

Evaluation 3: Performance Evaluation According to Use of Planarization Layer

In the multilayer thin film coating of Evaluation 1, the thickness of the lower protective layer was fixed to 2 nm, and Example 4 including a 10 nm-thick planarization layer ($Si_3N_4$:Zr doped 20%) between the lower barrier layer and the lower protective layer and Comparative Example 5 without including the planarization layer were prepared.

As a result of measuring the resistivity of the metal functional layer for each Example, Comparative Example 5 had the resistivity of 0.78 kcps·ohm/sq, and Example 4 had the resistivity of 0.74 kcps·ohm/sq, and thus, it was confirmed that the resistivity of the metal functional layer may be reduced by including the planarization layer.

(wherein, the resistivity value is obtained as XRF intensity*sheet resistance value)

As such, according to an exemplary embodiment of the present disclosure, in the transparent substrate with the multilayer thin film coating, even when the emissivity is lowered by increasing the thickness of the metal functional layer to 12 nm or more, it was confirmed that the initial performance may be maintained excellently without rapid performance deterioration due to repeated exposure to a high temperature, that is, the increased emissivity and the deterioration of the thermal insulation performance. Accordingly, it can be suitably used as a door or window (for example, an oven door) of a heating device in which heating to a high temperature and cooling are repeatedly performed.

The present disclosure can be manufactured in various different forms, not limited to the above embodiments, and it will be appreciated to those skilled in the present disclosure that the present disclosure may be implemented in other specific forms without changing the technical idea or essential features of the present disclosure. Therefore, it should be appreciated that the aforementioned exemplary embodiments are illustrative in all aspects and are not restricted.

While the above description constitutes the preferred embodiment of the present disclosure, it will be appreciated that the disclosure is susceptible to modification, variation and change without departing from the proper scope and fair meaning of the accompanying claims.

The invention claimed is:

1. A transparent substrate constituting a high-temperature heating device with a multilayer thin film coating, wherein
   the multilayer thin film coating includes a lower dielectric layer, a lower protective layer, a metal functional layer having an infrared reflection function, an upper protective layer, and an upper dielectric layer, which are sequentially laminated on the transparent substrate,
   the thickness of the metal function layer is 12 nm or more, and
   the thickness of the lower protective layer is larger than that of the upper protective layer and the thickness of the lower protective layer is 2 nm or more,
   wherein the lower dielectric layer includes a lower barrier layer and a planarization layer on the lower barrier layer, and the planarization layer is formed in contact directly under the lower protective layer, and
   wherein the planarization layer is formed by doping silicon nitride with zirconium (Zr).

2. The transparent substrate of claim 1, wherein:
the lower barrier layer has a refractive index of 2.0 to 2.2.

3. The transparent substrate of claim 1, wherein:
the thickness of the upper protective layer is 0.3 nm to 0.7 nm.

4. The transparent substrate of claim 1, wherein:
the thickness of the lower protective layer is 2.5 nm or more.

5. The transparent substrate of claim 1, wherein:
the thickness of the metal functional layer is 15 nm or more.

6. The transparent substrate of claim 1, further comprising:
an overcoat on the upper dielectric layer,
wherein the overcoat includes titanium oxide ($TiO_2$).

7. The transparent substrate of claim 1, wherein:
each of the upper protective layer and the lower protective layer includes one or more of titanium, nickel, chromium and niobium, or an alloy thereof.

8. The transparent substrate of claim 7, wherein:
each of the upper protective layer and the lower protective layer includes a nickel-chromium alloy.

9. The transparent substrate of claim 1, wherein:
the lower barrier layer includes silicon nitride.

10. The transparent substrate of claim 1, wherein:
the thickness of the planarization layer doped with the zirconium (Zr) is less than 15 nm.

11. The transparent substrate of claim 1, wherein:
a vertical emissivity (normal emissivity) is 0.035 or less.

12. The transparent substrate of claim 1, wherein:
a shading coefficient is 0.55 or less.

13. The transparent substrate of claim 1, wherein:
a visible light transmittance is 65% to 85%.

14. The transparent substrate of claim 1, wherein:
a visible light reflectance of the coating surface is 3% to 20%.

15. An oven door comprising the transparent substrate of claim 1.

* * * * *